United States Patent [19]
Eckel et al.

[11] Patent Number: 5,462,261
[45] Date of Patent: Oct. 31, 1995

[54] SWITCHABLE HYDRAULICALLY DAMPING MOUNT

[75] Inventors: Hans-Gerd Eckel, Laudenbach; Anja Kunkel, Siedelsbrunn; Michael Müller, Darmstadt, all of Germany

[73] Assignee: Firma Carl Freudenberg, Weinheim, Germany

[21] Appl. No.: 303,856

[22] Filed: Sep. 9, 1994

[30] Foreign Application Priority Data

Sep. 9, 1993 [DE] Germany ............ 43 30 560.1

[51] Int. Cl.$^6$ ............................................. F16F 5/00
[52] U.S. Cl. .................. 267/140.13; 267/219; 267/140.4
[58] Field of Search ........................ 267/35, 140, 140.13, 267/140.4, 140.5, 219; 248/566, 632, 634, 636, 638; 180/300, 312

[56] References Cited

U.S. PATENT DOCUMENTS

| | | |
|---|---|---|
| 4,852,864 | 8/1989 | Bitschkus et al. ............ 267/219 |
| 4,877,225 | 10/1989 | Noguchi et al. ............ 267/35 |
| 4,913,409 | 4/1990 | Doi et al. ............ 267/140.13 |
| 4,921,049 | 5/1990 | Kaiser et al. ............ 267/219 |
| 4,921,232 | 5/1990 | Hofmann ............ 267/219 |
| 5,102,105 | 4/1992 | Hamaekers et al. ............ 267/219 |
| 5,215,294 | 6/1993 | Muramatsu et al. ............ 267/140.13 |
| 5,344,127 | 9/1994 | Hettler et al. ............ 267/140.13 |

FOREIGN PATENT DOCUMENTS

| | | | |
|---|---|---|---|
| 0354381 | 2/1990 | Germany ............ | 180/312 |
| 0395795 | 11/1990 | Germany ............ | 267/219 |
| 4141332 | 6/1993 | Germany . | |

*Primary Examiner*—Robert J. Oberleitner
*Assistant Examiner*—Chris Schwartz
*Attorney, Agent, or Firm*—Kenyon & Kenyon

[57] ABSTRACT

A switchable hydraulically damping mount, having a supporting mount and a supported mount which are resiliently braced against one another by a support spring made of an elastomeric material. The mount includes at least two working chambers filled with fluid and arranged one behind another in the direction of vibrations introduced during operation. The working chambers are delimited on the sides facing one another by a common partition and are connected in a fluid-carrying manner to one another by at least one damping channel arranged in the partition. The partition has a central recess that is a component of a passthrough opening, such that the passthrough opening can be opened by an actuator, which can be acted on by a pressure medium, of a positioning device. The passthrough opening has a meander-shaped cross section extending in the radial direction.

10 Claims, 2 Drawing Sheets

SWITCHABLE HYDRAULICALLY DAMPING MOUNT

BACKGROUND OF THE INVENTION

1. Field of the Invention

The present invention concerns a switchable hydraulically damping mount. The hydraulically damping mount includes a supporting mount and a supported mount which are resiliently braced against one another by a support spring made of an elastomeric material. The support spring includes at least two working chambers, filled with fluid and arranged one behind another in the direction of the vibrations introduced during operation. The chambers are delimited on the sides facing one another by a common partition and are connected in a fluid-conveying manner to one another by at least one damping channel arranged in the partition. The partition has a central recess that is a component of a passthrough opening, such that the passthrough opening can be opened by an actuator of a positioning device, which can be acted on by a pressure medium.

2. Description of the Prior Art

A mount of this kind is shown in DE-OS 41 41 332. The actuator in the mount shown in that publication consists of a piston that is associated, in a gas-tight manner allowing relative movement, with a control pressure capsule. The control pressure capsule can be acted upon by a pressure medium and is arranged in fixed fashion in the mount housing, such that the control pressure capsule can be acted upon pneumatically by negative or positive pressure depending on the configuration of the mount. This mount is configured as an engine mount, the central passthrough opening being closed off during operation by a plug-shaped bead. Low-frequency vibrations with large amplitudes are damped by a displacement of fluid inside the damping channel, while high-frequency vibrations with small amplitudes are isolated by the axially movable membrane arranged inside the partition. However, in the device disclosed in DE-OS 41 41 332, the annular surface of the membrane has small dimensions. In addition, the fluid volume inside the open passthrough opening used to achieve the vibration canceling effect is comparatively small.

BRIEF DESCRIPTION OF THE INVENTION

The underlying object of the present invention is to develop a mount so that a considerably reduced effective mount stiffness is present, especially during idling.

To achieve the object of the present invention, provision is made for the passthrough opening to have a meander-shaped cross section extending in the radial direction. This passthrough opening is formed by the serial succession of the central recess and the annular spaces that result from the meander-shaped cross section. The cross sections of all the channel sections are approximately identical. Because of this configuration, a canceling effect is present when the channel is open. Tuning of this canceling effect leads to a much lower effective mount stiffness at idling speeds of the engine, and therefore to improved isolation of troublesome engine vibrations. The number of meanders succeeding one another in the radial direction can be adapted to the particular circumstances of the application; it is significant that because of the configuration of the passthrough opening, the mount according to the present invention has compact dimensions in the axial direction.

With a view to simple and cost-effective production, according to an advantageous embodiment, provision can be made for the passthrough opening to be delimited by the partition and the actuator. The recess is concentrically surrounded by a circular groove open in the direction of the actuator, such that the actuator is cup-shaped with a rim projecting axially in the direction of the partition, and such that the axial delimitation can be brought, if necessary, into sealing engagement with the groove base of the groove. Because the passthrough opening is formed by two components that together form the meander-shaped channel, shaping and production of the two components is simple, so that the mount can be produced in a cost-effective manner.

The actuator can have a sealing surface made of an elastomeric material. This minimizes impact noise and shock when the actuator operates, and results in reliable sealing of the passthrough opening over a long service life. Laborious machining of the groove base to achieve the lowest possible surface roughness is made superfluous by coating the rim with an elastomeric material.

To improve isolation of acoustically disturbing higher-frequency vibrations, provision is made for the cup-shaped actuator to be provided with a vibratable bottom made of elastomeric material, and for the bottom to be configured as a switchable central membrane. The central membrane can be switched in such a way that when the passthrough opening is closed off, i.e. when an attached internal combustion engine is operating at above idle speed, it is vibratably mounted in order to isolate higher-frequency vibrations. On the other hand, when the passthrough opening is opened in order to reduce vibrations associated with idling, the central membrane is preloaded and arranged rigidly relative to the actuator.

Preferably, the actuator and the central membrane can be only be acted upon by the pressure medium together, and can only be actuated synchronously. The advantage in the present invention is that only one actuation device is needed to actuate both the actuator and the central membrane, which is of noteworthy advantage both with regard to simple construction of the mount and in economic terms.

The sealing surface and the central membrane can be configured integrally and continuously with one another. Integral configuration guarantees relatively simple production and a completely sealed joint between the parts. According to another embodiment, the sealing surface and the central membrane, which are configured integrally and continuously with one another, can be integrally joined to a membrane that is utilized. The membrane seals the working chamber facing the actuating element in a fluid-tight manner. This membrane is configured so that as fluid is displaced from one working chamber to the other, it can increase in volume largely without pressure.

To achieve effective isolation of higher-frequency vibrations, the partition is preferably configured in two parts in the axial direction and perforated in a grid-like manner, such that the partition surrounds an annular membrane only in the region of the grid-like structure.

When the actuator is not acted upon by pressure and the passthrough opening is closed, the central membrane and the annular membrane are associated with one another in a functionally parallel relationship. This configuration results in particularly efficient isolation of higher-frequency vibrations.

Operation of the mount is as follows. When the mount is used, for example, to support an internal combustion engine in a motor vehicle, a distinction is made substantially between the operating states in which the mount is and is not acted upon by pressure. When the internal combustion engine is operating above idle speed, the central passthrough opening of the partition is closed off by the spring-loaded actuator. The mount operates like hydraulic mounts known in the art: low-frequency vibrations with large amplitudes are damped by displacements of fluid within the damping channel. Higher-frequency vibrations with small amplitudes are isolated by the membrane, arranged inside the partition and movable axially in the direction of the introduced vibrations. To improve isolation of acoustically troublesome vibrations, the mount according to the invention has, in addition to the annular membrane arranged inside the partition, a central membrane that in the operating state described above is arranged vibratably in the central region of the mount. This configuration of components arranged functionally in parallel makes a comparatively large area available for the isolation of higher-frequency vibrations.

The mount switches over when the attached internal combustion engine is running in the near-idle speed range. To minimize the vibrations occurring in this operating state, the actuator and the central membrane are acted upon by negative pressure, such that the central passthrough opening is uncovered by the actuator, and the two working chambers are then connected in fluid-carrying manner to one another via this route. The central membrane, which is also acted upon by negative pressure, is held under preload. The result is a progressive curve for force or pressure vs. travel. The resilience of the central membrane is then reduced to a minimum. The fluid mass located in the passthrough opening becomes effective as a canceling mass, and leads to a much lower effective mount stiffness.

Above idle speed, in the state not acted upon by negative pressure, the actuator is moved toward the partition by a return spring built into the mount— which for example can be configured as a helical compression spring—until the passthrough opening is closed off in a fluid-tight manner. The mount exhibits not only excellent utilization characteristics, in terms of damping low-frequency vibrations and isolating higher-frequency vibrations in speed ranges above idle, but also good isolation of engine vibrations resulting from idle.

When the actuator is acted upon by pressure, the passthrough opening can preferably have an identical passthrough cross section along its entire radial extent. It is advantageous that because of the largely constant cross section of the passthrough opening, almost no flow losses occur when fluid is displaced inside the passthrough opening, and the mount thus exhibits a particularly good canceling effect.

In general, the mount according to the present invention can be acted upon by positive or negative pressure depending on the mount's configuration. Preference is given in the context of the present invention, however, to the action of negative pressure, since in motor vehicles negative pressure is available, for example in the intake manifold, and therefore does not need to be generated by additional and costly pumps.

BRIEF DESCRIPTION OF THE DRAWINGS

The mount according to the present invention will be described in more detail below with reference to the drawings, wherein.

DETAILED DESCRIPTION OF THE DRAWINGS

Figure 1:
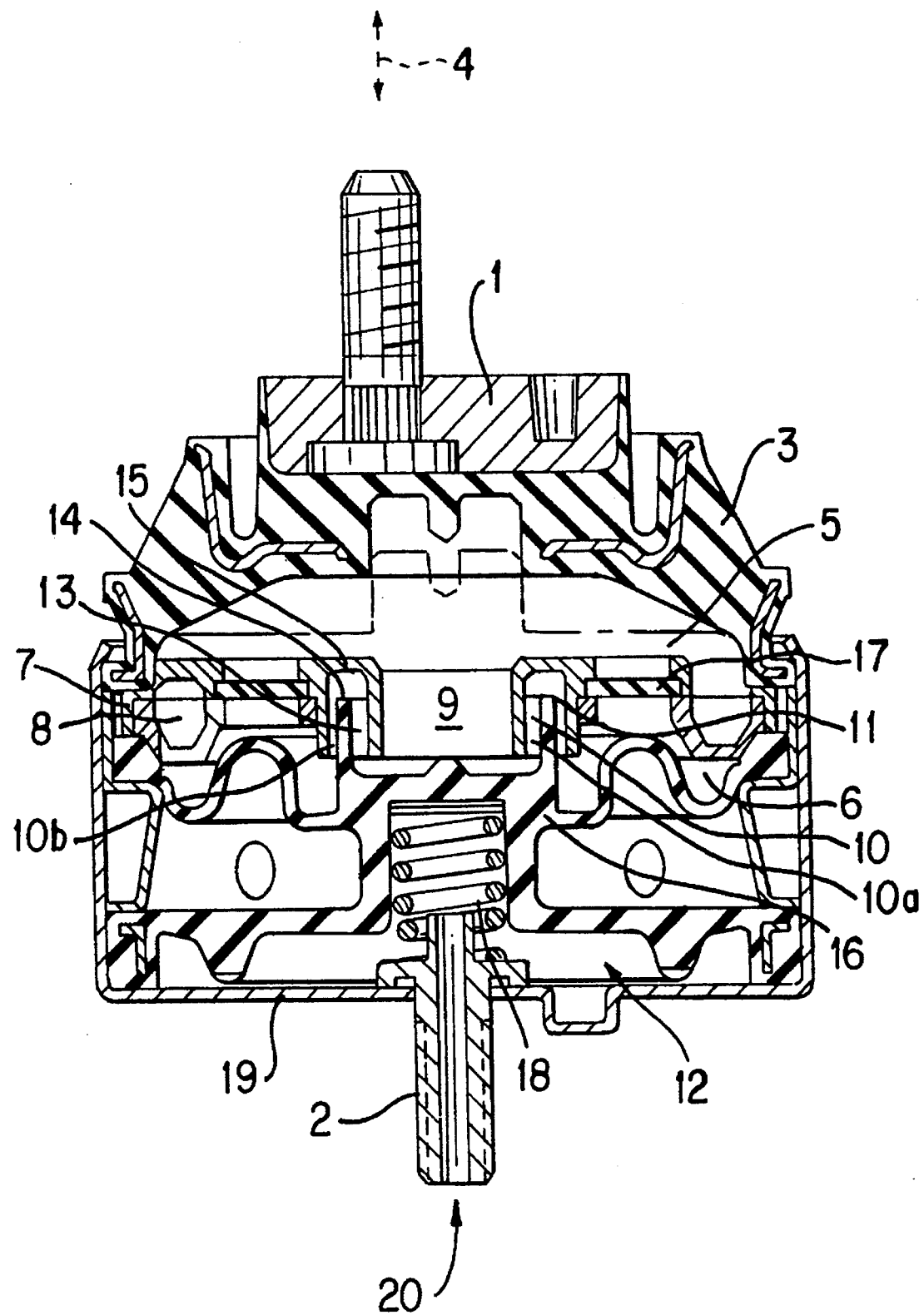
FIG. 1, shows the mount of the present invention in a state acted upon by negative pressure.
Figure 2:
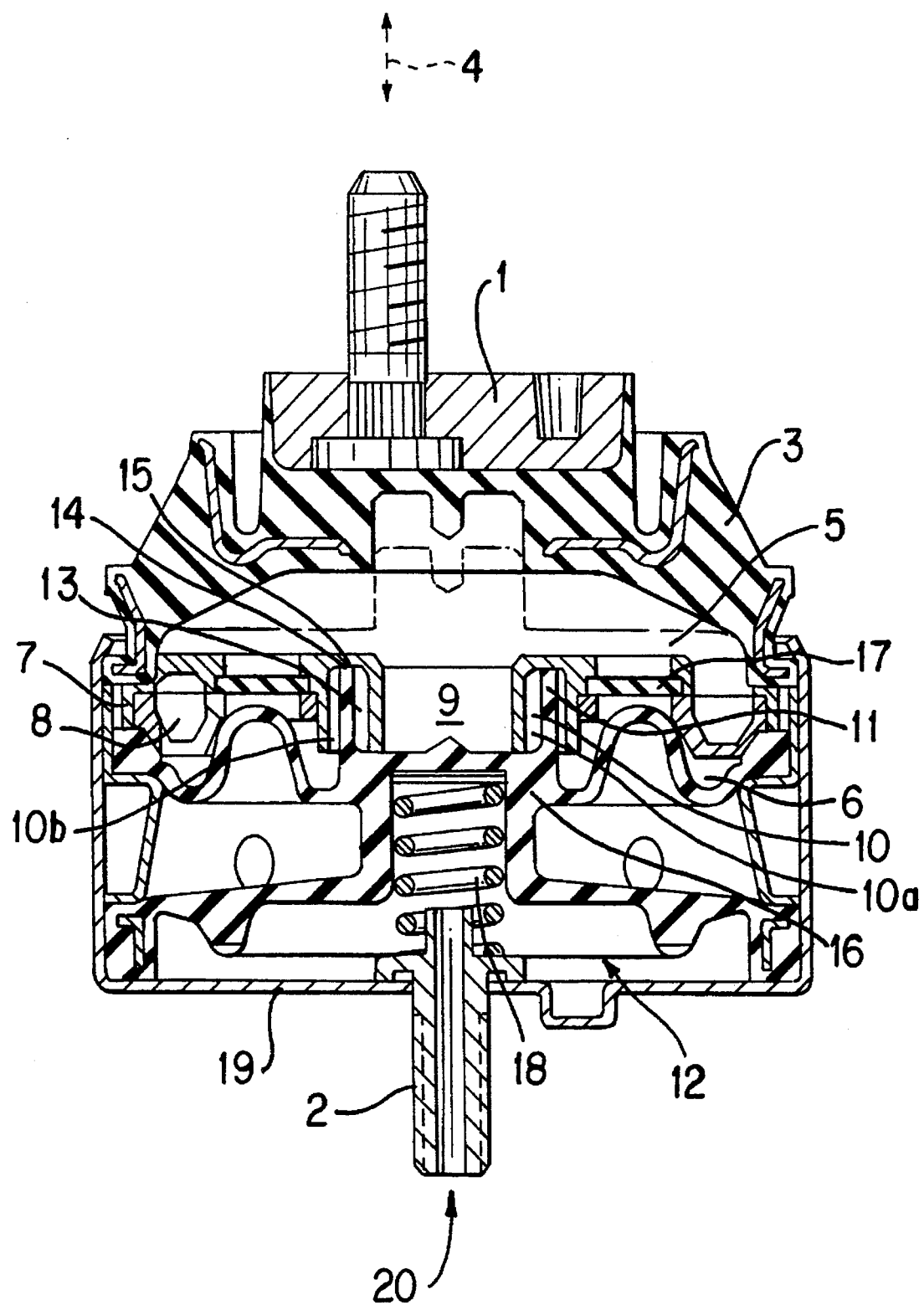
FIG. 2, shows the mount of FIG. 1 in the state in which the mount is not acted upon by negative pressure.

FIGS. 1 and 2 show an exemplary embodiment of the switchable hydraulically damping mount according to the present invention, comprising a supporting mount 1 and a supported mount 2 that are resiliently braced against one another by a support spring 3 made of an elastomeric material. Two working chambers 5, 6, which are separated from one another by a partition 7, are provided inside the mount, in the direction of the introduced vibrations 4. In the exemplary embodiment of FIG. 1, the two working chambers 5, 6 are connected to one another in a fluid-conveying manner by an annular damping channel 8. Damping channel 8 is delimited by partition 7. Partition 7 is in two parts in the axial direction. To isolate higher-frequency vibrations, an annular membrane 17 is mounted between the components of partition 7. Partition 7 has a centrally arranged recess 9 that constitutes a component of passthrough opening 10 and continues into subregions 10a and 10b. When actuator 11 is open, the passthrough opening has a meander-shaped cross section, extending with rotational symmetry in the radial direction. Actuator 11 is substantially cup-shaped, the bottom of actuator 11 consisting of a switchable central membrane 16. To eliminate flow losses, central membrane 16 is provided, in the region of recess 9, with an elevation that allows low-resistance flow through the open passthrough opening 10.

In FIG. 1 the mount is shown in the state acted upon by negative pressure. In this exemplary embodiment, negative pressure acts through a tubular mounting screw 20; negative pressure (i.e., pressure less than atmospheric) holds actuator 11 of actuation device 12 in the open position against the force of a return spring 18. Return spring 18 is guided in a cup-shaped sheet-metal element 19 that has in its central region a recess in the base. The recess inside sheet-metal element 19 allows the action of negative pressure and preloading of central membrane 16.

FIG. 2 shows the mount from FIG. 1 as the internal combustion engine (not shown) is being operated at a speed above idling speed. Both actuator 11 of actuation device 12 and central membrane 16 are then not acted upon by negative pressure, such that actuator 11 is brought by return spring 18 into sealed engagement with groove base 15 of groove 13. The cup-shaped actuator 11 is enveloped on all sides by elastomeric material, thus guaranteeing a reliable seal of rim 14 with respect to groove base 15. The manner in which the mount functions in this operating state substantially corresponds to the manner of operation of known hydraulic mounts. Unlike these known mounts, membrane 17 and central membrane 16 are arranged in a functionally parallel relationship to one another, so that the resulting larger surface area can produce substantially more efficient isolation of higher-frequency vibrations.

Activation of pressure action in the mount of the present invention is not the subject of the present invention, and is accomplished, for example, via the electronic engine controller of an internal combustion engine as a function of speed.

We claim:

1. A switchable hydraulically damping mount, comprising:

a supporting mount;

a supported mount;

a support spring made of an elastomeric material, said supporting mount and said supported mount being resiliently connected to one another by said support spring;

a partition comprising at least one damping channel and a central recess, said central recess defining a portion of a passthrough opening, said partition comprising at least one annular, axial projection;

at least two working chambers filled with a fluid, said working chambers being arranged in a direction of vibrations introduced into said mount during operation, said chambers being delimited on sides facing one another by said partition, said chambers being connected in a fluid-conveying manner to one another by said at least one damping channel;

an actuator, said actuator comprising at least one annular, axial projection, said passthrough opening being opened by said actuator, said actuator being acted on by a pressure medium, said actuator and said partition defining portions of said passthrough opening, said passthrough opening having a meander-shaped cross section in a radial direction, said at least one projection of said partition and said at least one projection of said actuator defining a portion of said passthrough opening.

2. The mount according to claim 1, wherein:

said actuator has a sealing surface made of an elastomeric material.

3. The mount according to claim 2, wherein:

said sealing surface and a switchable central membrane on bottom of said actuator are constructed integrally and continuously with one another.

4. The mount according to claim 1, wherein:

said partition is constructed of two parts in an axial direction, said partition is perforated to form a grid-shaped structure, said partition surrounds an annular membrane in a region of said grid-shaped structure;

and wherein said cup-shaped actuator is provided with a bottom made of an elastomeric material and said bottom is configured as a switchable central membrane;

and wherein when said actuator is not acted upon by pressure and said passthrough opening is closed, said central membrane and said annular membrane are associated with one another in a functionally parallel relationship.

5. The mount according to claim 1, wherein:

when said actuator is acted upon by pressure, said passthrough opening has a uniform cross section along its entire radial extent.

6. The mount according to claim 1, wherein:

said cup-shaped actuator is provided with a bottom made of an elastomeric material and wherein said bottom is configured as a switchable central membrane;

and wherein said actuator and said central membrane can be acted upon pneumatically by a pressure less than atmospheric pressure.

7. A switchable hydraulically damping mount, comprising:

a supporting mount;

a supported mount;

a support spring made of an elastomeric material, said supporting mount and said supported mount being resiliently connected to one another by said support spring;

a partition comprising at least one damping channel and a central recess, said central recess defining a portion of a passthrough opening, said central recess being concentrically surrounded by a circular groove, said circular groove defining a portion of said passthrough opening;

at least two working chambers filled with a fluid, said working chambers being arranged in a direction of vibrations introduced into said mount during operation, said chambers being delimited on sides facing one another by said partition, said chambers being connected in a fluid-conveying manner to one another by said at least one damping channel;

an actuator, said passthrough opening being opened by said actuator, said actuator being cup-shaped with a rim projecting axially in a direction toward said partition, said actuator being acted on by a pressure medium, said circular groove being open in a direction of said actuator, said rim defining a portion of said passthrough opening, said passthrough opening having a meander-shaped cross section in a radial direction, wherein an axial delimitation of said rim can seal against a portion of said groove to thereby close said passthrough opening.

8. The mount according to claim 7, wherein:

said cup-shaped actuator is provided with a bottom made of an elastomeric material and wherein said bottom is configured as a switchable central membrane.

9. The mount according to claim 8, wherein:

said cup-shaped actuator and said central membrane can only be acted upon by a pressure medium together, and can only be actuated upon synchronously 10. A switchable hydraulically damping mount, comprising:

a supporting mount;

a supported mount;

a support spring made of an elastomeric material, said supporting mount and said supported mount being resiliently connected to one another by said support spring;

a partition comprising at least one damping channel and a central recess, said central recess defining a portion of a passthrough opening, said partition being constructed of two parts in an axial direction, said partition being perforated to form a grid-shaped structure, said partition surrounding an annular membrane in a region of said grid-shaped structure;

at least two working chambers filled with a fluid, said working chambers being arranged in a direction of vibrations introduced into said mount during operation, said chambers being delimited on sides facing one another by said partition, said chambers being connected in a fluid-conveying manner to one another by said at least one damping channel;

an actuator, said passthrough opening being opened by said actuator, said actuator being acted on by a pressure medium, said actuator and said partition defining a portion of said passthrough opening, said passthrough opening having a meander-shaped cross section in a radial direction.

* * * * *